(12) United States Patent
Fangmeier et al.

(10) Patent No.: US 10,983,491 B2
(45) Date of Patent: Apr. 20, 2021

(54) AUTOMATION DEVICE AND METHOD FOR OPERATING AN AUTOMATION DEVICE

(71) Applicant: WAGO Verwaltungsgesellschaft mbH, Minden (DE)

(72) Inventors: Niels Fangmeier, Rahden (DE); Stefan Van Lier, Minden (DE)

(73) Assignee: WAGO Verwaltungsgesellschaft mbH, Minden (DE)

( * ) Notice: Subject to any disclaimer, the term of this patent is extended or adjusted under 35 U.S.C. 154(b) by 38 days.

(21) Appl. No.: 16/247,195

(22) Filed: Jan. 14, 2019

(65) Prior Publication Data

US 2019/0219977 A1    Jul. 18, 2019

(30) Foreign Application Priority Data

Jan. 12, 2018  (DE) .................... 10 2018 100 657.8

(51) Int. Cl.
*G05B 19/042*    (2006.01)

(52) U.S. Cl.
CPC .... *G05B 19/042* (2013.01); *G05B 2219/2642* (2013.01)

(58) Field of Classification Search
CPC ........ G05B 19/042; G05B 2219/25109; G05B 2219/25092; G05B 2219/23427; G05B 2219/2642
See application file for complete search history.

(56) References Cited

U.S. PATENT DOCUMENTS

2008/0315797 A1* 12/2008 Sanchez .............. H02P 23/0077
                                                                 315/309
2010/0100198 A1*  4/2010 Hermann ........... G05B 19/0426
                                                                 700/11
(Continued)

FOREIGN PATENT DOCUMENTS

WO     WO2017153796 A1     9/2017

OTHER PUBLICATIONS

ODVA, The Common Industrial Protocol (CIP™) and the Family of CIP Networks, 2016 (Year: 2016).*

*Primary Examiner* — Mohammad Ali
*Assistant Examiner* — Vincent W Chang
(74) *Attorney, Agent, or Firm* — Muncy, Geissler, Olds & Lowe, P.C.

(57) ABSTRACT

An automation device, having an input for receiving input signals and/or an output for outputting output signals of a process, and an electronic data processing unit, which is adapted to run an application program during operation of the automation device and to process data contained in the input and/or output signals by means of a program function, characterized in that in a digital program memory, a plurality of program functions is stored separately to the application program, which are each uniquely addressable via a function pointer, wherein during operation of the automation device, based on a predetermined function selection, the application program is configured to determine the function pointer of the program function corresponding to the predetermined function selection from a functions reference list stored in a digital data memory and, by means of the determined function pointer, to run the program function corresponding to the predetermined function selection for processing the data contained in the input and/or output signals.

8 Claims, 2 Drawing Sheets

(56) References Cited

U.S. PATENT DOCUMENTS

2016/0246276 A1* 8/2016 Rischar ................ G05B 19/042
2016/0363919 A1* 12/2016 Anderson .......... G05B 19/0426
2019/0050212 A1 2/2019 Ido et al.

* cited by examiner

AUTOMATION DEVICE AND METHOD FOR OPERATING AN AUTOMATION DEVICE

This nonprovisional application claims priority under 35 U.S.C. § 119(a) to German Patent Application No. 10 2018 100 657.8, which was filed in Germany on Jan. 12, 2018, and which is herein incorporated by reference.

BACKGROUND OF THE INVENTION

Field of the Invention

The present invention relates to an automation device for process automation, wherein the automation device has an input for receiving input signals and/or an output for outputting output signals for controlling and regulating the process. The invention also relates to a method for operating such an automation device in order to at least partially automate the process.

Description of the Background Art

With the aid of automation devices that are used individually or combined to form an entire automation system, processes can be partially or completely automated by generally collecting data from external encoders, processing them with the aid of the automation system and then outputting corresponding signals to actuators based on an automatic control system so as to regulate the process in terms of its boundary conditions.

For example, it is known from building automation that a plurality of sensors, such as temperature sensors, detect corresponding values and transmit them to a central automation device which then controls corresponding actuators, such as heating valves or controllers, based on its automation program and the setting made, so as to approximate the desired characteristic to a predetermined setpoint. Not infrequently, such automation systems with one or more automation devices are also used for safety-critical applications in which the correct functional execution is essential for the protection of persons.

In addition to inputs for receiving input signals and outputs for outputting output signals, an automation device also has for this purpose an electronic data processing unit on which an application program, also called firmware, is run and controls and regulates the desired behavior of the automation device. The application program of an automation device is decisively responsible for the processing of the data contained in the input and/or output signals so as to influence the relevant process variables of the process to be automated. For this purpose, it is not uncommon for the data contained in the input signals to be processed, analyzed, and then based on this, corresponding data for outputting the output signals to be generated, which is summarized under the concept of data processing.

Depending on the intended use of the automation device and the underlying process to be automated, the automation system can have a relatively long service life, so it is not uncommon in particular in building automation that such automation systems are in use for one or more decades. If changes to the automation device need to be made, for example, by adding further sensors, actuators or improvements to the application program, i.e., the firmware, then as a rule the entire firmware must be replaced by a newer version in order to implement new program features and to provide support for new sensors and actuators added in the automation system by the application software. However, in safety-critical applications, the complete replacement of the application software not infrequently creates the obligation to have the entire system rechecked and approved by an auditing agency or examining authority, which can be very comprehensive given the complexity of such automation systems. In view of the above, subsequent additions to such automation systems must therefore be considered economically, in order to prevent simple adjustments from having enormous financial consequences due to repeated testing and approval of the automation system is provided.

It is therefore desirable if automation devices for the automation of processes could be supplemented or changed in terms of new functionalities throughout their service life when in use or during operation without the need for the entire automation system to be rechecked and re-approved by an examining authority.

SUMMARY OF THE INVENTION

It is therefore an object of the present invention to provide an improved automation device and an improved method for operating such an automation device, which can be upgraded or changed during operation without the application program itself needing to be changed and thus the entire automation device needing to be rechecked and approved.

In an exemplary embodiment, an automation device with an input for receiving input signals and/or an output for outputting output signals of a process is provided, wherein the automation device has an electronic data processing unit on which an application program is run or can be run. The application program controls the automation device and, in particular, processes the data necessary for the automation. By means of a program function, the data can be processed accordingly, i.e., modified or generated, for which purpose the application program runs the program function and as a result, receives the data processed by the program function.

According to the invention, it is now provided that such a program function is not, as is normally the case with automation devices, an integral part of the application program, i.e., the firmware of the automation device, but that the program functions that are required for processing the data are present separately in a digital program memory, wherein the program functions are present independently and separately from the application program in the manner of a callback function. Within the digital program memory, the individual program functions can be addressed using a unique function pointer so that the desired program function can be called from the digital program memory and run with the knowledge of the function pointer.

In the digital program memory, there is a plurality of such program functions, so that the application program during operation of the automation device, i.e., while the application program is running, dynamically calls the desired program function using the unique function pointer and obtains as a result the data processed for the process automation.

In order to obtain the correct function pointer for the desired program function, the automation device has a functions reference list in a digital data memory, in which the individual function pointers are contained in the manner of a list. Based on a predetermined function selection, which corresponds to the desired program function, the desired function pointer is then determined from the functions reference list, the former addressing the program function corresponding to the predetermined function selection. Subsequently, the desired program function is called and run from the digital program memory using this function pointer determined from the functions reference list, wherein the result of the run program function is then returned to the application program and used for further processing.

Separating the program functions from the actual application program, i.e., the firmware, within an automation device, ensures that individual program functions can be changed without the entire firmware or the other program functions being affected and, for example, having to be re-approved. In addition, by means of a separately present functions reference list, it can also be achieved that further program functions can be added during the upgrade of the automation system without the other components of the software being affected. Rather, only additional program functions are added in the digital program memory and the functions reference list, so that only these must be approved or checked in safety-critical applications, while the remaining components of the automation system can stay in operation.

The inventors have recognized that despite the very limited resources of an automation device, such a separation of application program, separate program functions and a separate functions reference list of an automation device can be provided which can be upgraded even after many years by adding additional components without the entire software inventory of the automation equipment needing to be replaced.

The electronic data processing unit may include a microprocessor-controlled computing unit, for example a CPU, which is set up and configured to run an application program.

The digital program memory can be a non-volatile memory, in which the individual program functions are shielded separately from the application program. For executing the program function, to which the corresponding function pointer refers, the program function is loaded into a usually volatile memory and run there with the aid of the electronic data processing unit.

The function pointer can be a unique identifier, for example an alphanumeric identifier, with which the desired program function can be clearly identified and addressed. With the aid of the function pointer, the desired program function can thus be identified so that it can be called and run by the application program.

A program function is a software component separate from the application program, which could be exchanged separately in order to change the application program for this purpose. In particular, the program function is located in a memory area that is separate and different from the memory area of the application program.

The functions reference list can be a text-based file which is likewise separate from the application program and is stored, in particular, in a memory area which is separate and different from the application program and the program functions.

The automation device can be set up, if necessary, to load the program function identified by the function pointer from the digital program memory to a digital main memory and to run it there, wherein the program function is again deleted from the digital main memory after execution and the digital main memory occupied by the program function is again freed up. Thus, the program function is loaded only temporarily into main memory by means of the function pointer, whereby in particular the resources limited in an automation device are addressed and managed properly. This also makes it possible to update already existing automation systems, which may already have been in use for several years and thus have far more limited resources than today's automation facilities, with such a program package, since the individual program functions are loaded only temporarily to the limited memory, wherein nonetheless, the greatest possible flexibility can be achieved with older automation devices.

The function attributes provided for calling the respective program function can be contained in the functions reference list for each program function referenced by the respective function pointer, wherein based on the predetermined function selection from the functions reference list stored in a digital data memory, the application program is then set up to further determine the function attributes with respect to the program function referenced by the determined function pointer, in order to run the desired program function for processing the data contained in the input and/or output signals by means of the determined function pointer and the function attributes.

As a result, the greatest possible flexibility when calling the program function can be guaranteed, since now the functional attributes required for the function call, i.e., the input data anticipated by the program function, can also be dynamically specified via the functions reference thereby providing and ensuring the greatest possible flexibility with regard to adapting the program functions and calls of the program functions during operation of the automation device.

The automation device can be set up during operation of the automation device to add additional program functions in the digital program memory, to replace and/or delete existing program functions in the digital program memory, and to adapt the functions reference list stored in the digital data memory to the latter change, i.e., replace it with a correspondingly changed functions reference list during operation of the automation device, without interrupting the application program. This is now possible because the program functions, the application program and the functions reference list are stored in separate and mutually different memory areas and are run separately, so that the components of the program functions and the functions reference list can be replaced without interrupting the application program. The application program is designed in such a way that it recognizes a change to the program functions or to the functions reference list and starts an initialization process with which the functions reference list is optionally read, and thus the new program functions can also be called and used.

One or more program functions stored in the digital program memory for calculating a function value, in particular a return value of the program functions, can be designed such that a polynomial of the nth degree is used, wherein in the functions reference list stored in the digital data memory for the corresponding program function referenced by the respective function pointer, the respective coefficients are stored, with which the polynomial of the nth degree is to calculate the function value. The application program is now set up in such a way that, based on the predetermined function selection from the functions reference list stored in a digital data memory, it further determines the coefficients with respect to the program function referenced by the determined function pointer and calls the program function by means of the determined function pointer and the coefficients, and calculates the function value.

By using polynomials of the nth degree, it is possible to specify the calculation of the function value very flexibly, since by specifying the coefficients, ultimately the type of calculation of the function value can be influenced. Higher degree polynomials are more accurate but are more CPU-intensive. By changing the coefficients at runtime of the application program, i.e., during operation of the automation device, it is thus possible, for example, to react to changing boundary conditions or address newly added elements of the automation system, which are merely adapted to the coefficients corresponding to the function call.

As already mentioned above, it is particularly advantageous if each program function in the functions reference list can be identified by a unique identifier that corresponds to the predetermined function selection, so that the corresponding list item, i.e., the program function to be selected, can be selected directly in the functions reference list by the unique identifier and, in addition to the function pointer, further parameters and attributes for calling the program function can also be read out if needed.

The predetermined function selection can be selected for certain actions, for example, with the help of a configuration program, which may be additional or a part of the application program, so that it is adjustable as to which program function the application program should call in which situation. Thus, for example, the application program can be connected with the respective program function to be called. It is also conceivable that this is provided by a configuration file or interface, for which the respective actions to be run by the application program and the respective program function is provided in the form of a predetermined function selection.

In addition, the object is also achieved with a method for operating an automation device, wherein first the application program determines a function pointer from a functions reference list stored in a digital data memory, based on a predetermined function selection, wherein the function pointer references one of several program functions stored in a digital program memory, wherein the program function referenced by the function pointer corresponds to the predetermined function selection. Subsequently, the program function is run by the application program using the determined function pointer.

Further scope of applicability of the present invention will become apparent from the detailed description given hereinafter. However, it should be understood that the detailed description and specific examples, while indicating preferred embodiments of the invention, are given by way of illustration only, since various changes, combinations, and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
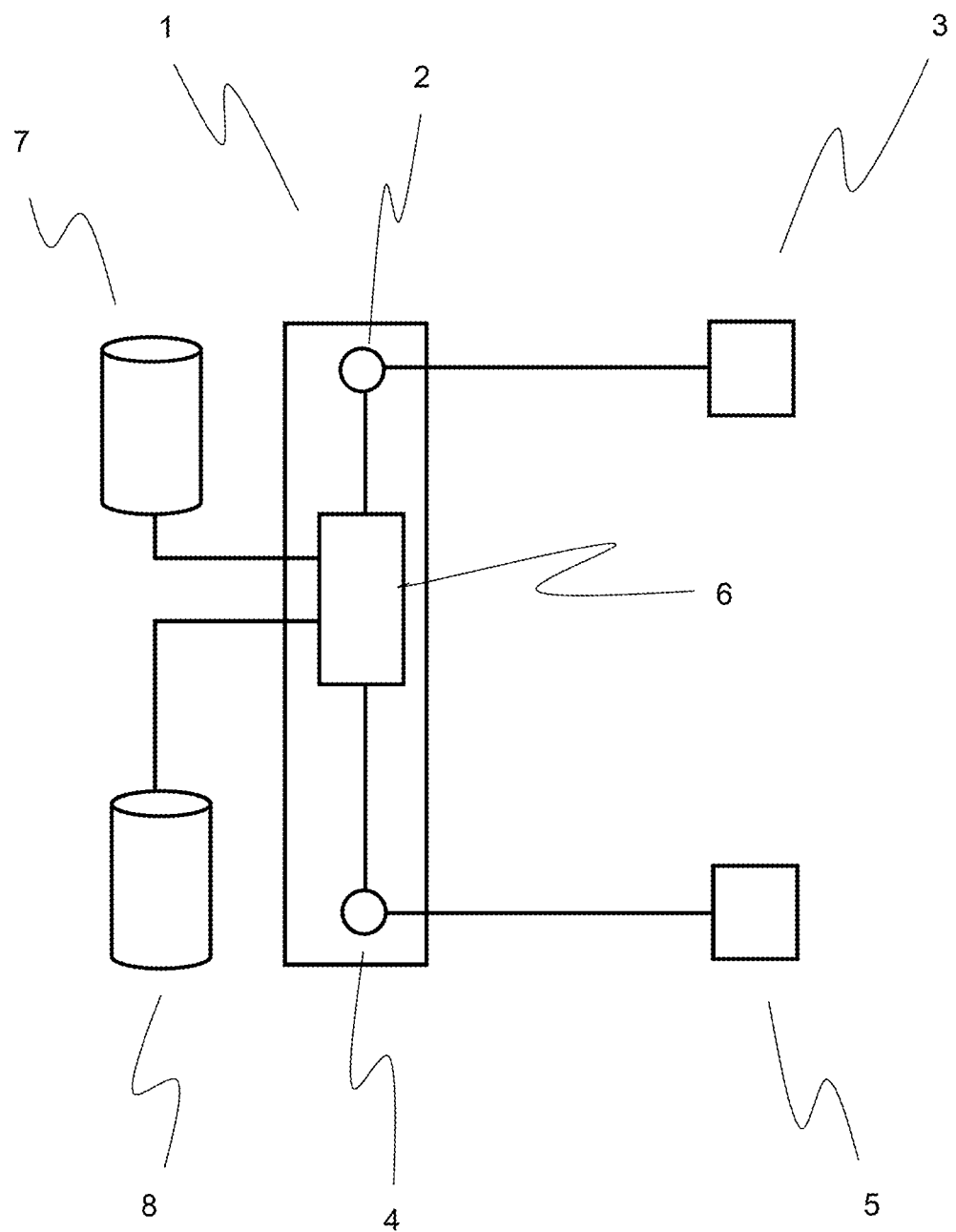
FIG. 1 is a schematic representation of an automation device.

FIG. 1 shows an automation device 1, which is connected to a sensor 3 via an input 2. In addition, the automation device 1 is connected via an output 4 with an actuator 5, which may be a control element for the control of the automation process. For example, it is conceivable that the sensor 3 is a temperature sensor, while the actuator 5 represents a control element for adjusting the heater.

The sensor 3 delivers a sensor signal, which is received by the input 2. In addition, an actuator signal can be sent to the actuator 5 with the aid of the output 4, wherein the input 2 and output 4 are connected to an electronic data processing unit 6 by means of electrical signals. The data processing unit 6 can be, for example, a microprocessor-controlled arithmetic unit which at a minimum has the generic elements such as CPU and main memory.

The electronic data processing unit 6 is also connected to a digital program memory 7 and a digital data memory 8, wherein both the digital program memory 7 and the digital data memory 8 can form a unit. These are, for example, non-volatile data memories which are present separately from main memory of the data processing unit 6.

The application program, that is to say the firmware of the automation device 1, is stored in the digital program memory 7. At the start of the automation device 1, the application program is loaded from the digital program memory 7 into main memory of the electronic data processing unit 6 and run there accordingly.

In addition to the application program, program functions are also stored in the digital program memory 7, which are separate from the application program and in particular are also stored in separate memory areas. The program functions may not be an integral part of the application program, so that the program functions can be changed in terms of their functionality and in terms of their scope, without having to change the application program.

In a digital data memory 8, finally, the functions reference list is stored, with which the application program can address the program functions accordingly. The digital data memory 8 can form a unit together with the digital program memory 7 and be a common data memory. For example, it is conceivable that the program memories 7 and 8 represent an SD card via which the corresponding program routines can be loaded into the automation device 1. It is also conceivable, however, that the data memories 7 and 8 are stored on a remote device, in which case the automation device 1 generates access thereto via a corresponding network.

In the exemplary embodiment of FIG. 1, only one input 2 and one output 4 are displayed for reasons of clarity, although in practice there should be considerably more. A sensor signal is supplied by the sensor 3 via the input 2, the data of which are digitally extracted and made available to the electronic data processing unit 6, provided that the sensor 3 is not a digital sensor. These data are subsequently processed accordingly by the application program, for which purpose the program functions stored in the digital program memory 7 are called with the aid of the functions reference list and the data is purposefully further processed there. Subsequently, a corresponding output signal is then generated from the data processed in this way, with which the actuator 5 is then activated via the output 4 in order to be able to act on the process path.

Figure 2:
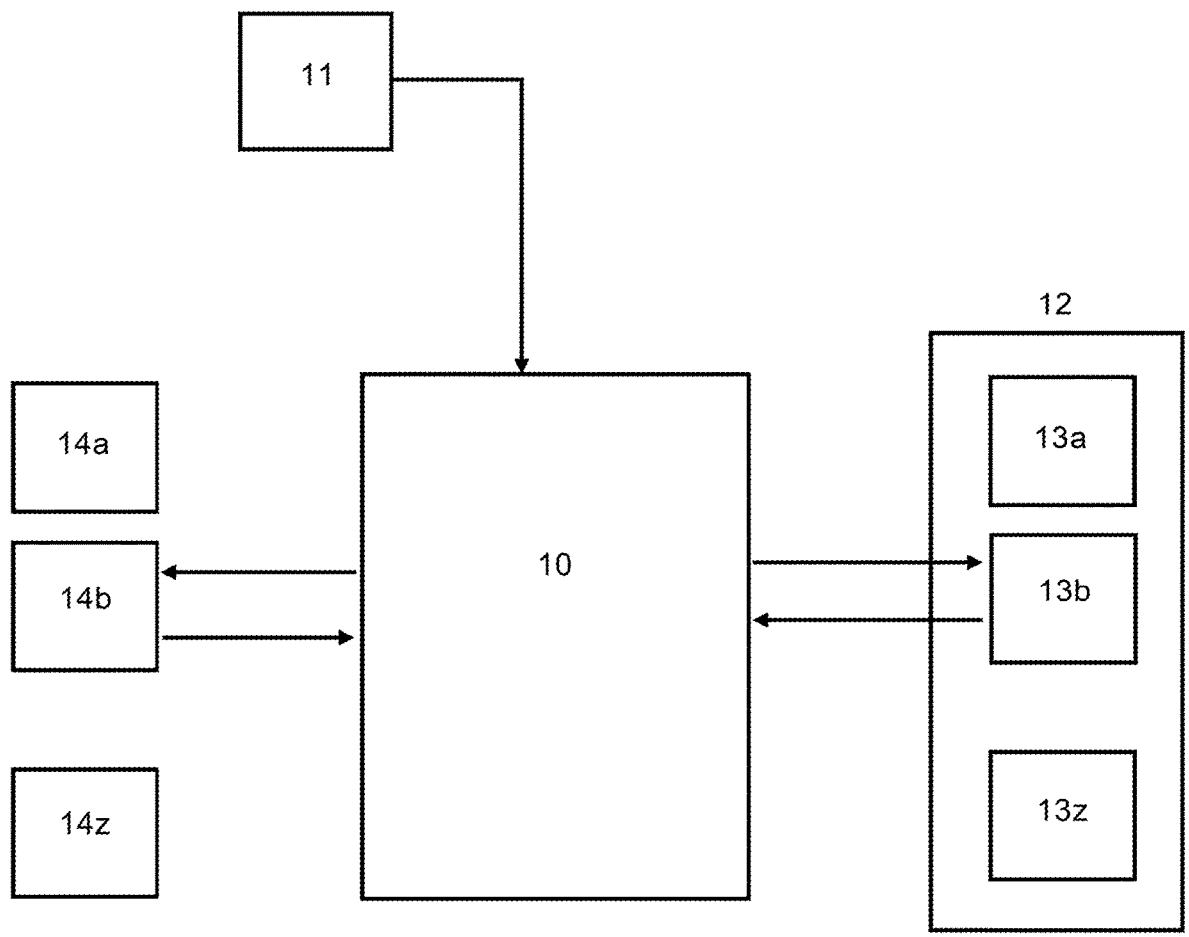
FIG. 2 is a representation of an operational sequence of the automation device.

FIG. 2 shows in more detail the sequence from a functional/schematic point of view. The application program 10 is the firmware of the automation device and controls all processes of the automation device both in terms of the automation device itself as well as in terms of process automation. In this case, the application program 10 can be configured with the aid of a configuration tool or a configuration mechanism 11 in accordance with the task of process automation and can be adapted to the circumstances.

In a functions reference list 12, a plurality of list items 13 are listed in a list-like manner, wherein each list item 13 refers to a program function 14 stored separately for the application program 10. The list item 13 of the functions reference list 12 contains, inter alia, a function pointer, which is provided and configured for addressing the program function 14 assigned to the respective list item 13. In addition to the function pointer for calling the corresponding program function, it is also possible to store function attributes with which the corresponding program function can be called in order to be able to call the program function in a semantically correct form.

With the help of the configuration tool 11, the application program 10 is now set up such that a program function 14 is selected for a corresponding processing of the data, which are known to the application program 10 via the list items 13 of the functions reference list 12. If a corresponding program function has been selected, then the application program 10 determines the function pointer, which is stored with the respective list item 13 for the selected program function.

Depending on the available resources, the application program 10 can now load the program function 14 as a precaution into main memory. It is also conceivable that the program function 14 is loaded on an as needed basis, so as to save resources of the main memory.

In this case, it is conceivable that during operation of the automation device and during the execution of the application program 10, the corresponding configuration is changed by means of the configuration tool 11, so that a corresponding selection with respect to a program function is deselected and a new program function is selected in its place, whereby in turn the corresponding function pointer is determined from the functions reference list and the respective list item, which corresponds to the respective, selected program function. In this case, it is conceivable that the deselected program function is then removed from main memory and the newly selected program function is loaded dynamically into main memory, where it is available for further processing.

The invention being thus described, it will be obvious that the same may be varied in many ways. Such variations are not to be regarded as a departure from the spirit and scope of the invention, and all such modifications as would be obvious to one skilled in the art are to be included within the scope of the following claims:

What is claimed is:

1. An automation device comprising:
   an input for receiving input signals and/or an output for outputting output signals of a process; and
   an electronic data processing unit configured to run an application program during operation of the automation device and to process data contained in the input and/or output signals via program functions;
   a digital program memory having a plurality of the program functions stored separately from the application program, the plurality of the program functions each being uniquely addressable via a function pointer;
   a digital data memory having a functions reference list stored therein,
   wherein during an operation of the automation device, and based on a predetermined function selection from the functions reference list, the application program is configured to determine the function pointer of the program function that corresponds to the predetermined function selection, and the application program is configured to run, via the determined function pointer, the program function corresponding to the predetermined function selection to process data contained in the input and/or output signals, and
   wherein one or more of the program functions stored in the digital program memory use a polynomial of the nth degree for calculating a function value, wherein in the functions reference list stored in the digital data memory, respective coefficients for the respective program function referenced by the respective function pointer are stored, wherein the application program is adapted to further determine the respective coefficients with respect to the program function referenced by the determined function pointer, based on the predetermined function selection from the functions reference list stored in the digital data memory, and to run the program function corresponding to the predetermined function selection for processing the data contained in the input and/or output signals via the determined function pointer and the respective coefficients,
   wherein, during operation of the automation device and without interrupting the application program, the automation device is set up to accommodate changes that include adding additional program functions in the digital program memory, replacing and/or deleting existing program functions in the digital program memory and adapting the functions reference list stored in the digital data memory to the changes.

2. The automation device according to claim 1, wherein the functions reference list is a text-based list file.

3. The automation device according to claim 1, wherein, via the determined function pointer, the application program is set up to load the program function corresponding to the predetermined function selection from the digital program memory to a digital main memory and to run the program function for processing the data contained in the input and/or output signals.

4. The automation device according to claim 1, wherein, in the functions reference list stored in the digital data memory, function attributes provided for a call of the respective program function are included for each program function referenced by the respective function pointer, wherein the application program is configured to further determine the function attributes with respect to the program function referenced via the determined function pointer, based on the predetermined function selection from the functions reference list stored in the digital data memory, and to run the program function corresponding to the predetermined function selection for processing the data contained in the input and/or output signals via the determined function pointer and the function attributes.

5. The automation device according to claim 1, wherein each program function in the functions reference list is identifiable by a unique identifier corresponding to the predetermined function selection.

6. A method for operating an automation device, the method comprising:
   receiving input signals via an input of the automation device and/or outputting output signals via an output of the automation device;
   processing data contained in the input and/or output signals via a program function of an application program provided in the automation device;
   determining a function pointer from a functions reference list stored in a digital data memory based on a predetermined function selection by the application program, wherein the function pointer references one of a plurality of program functions stored in a digital program memory, and wherein the program function referenced by the function pointer corresponds to the predetermined function selection; and running, via the determined function pointer, the program function corresponding to the predetermined function selection using the application program, wherein one or more of the program functions stored in the digital program memory use a polynomial of the nth degree to calculate a function value, wherein in the functions reference list stored in the digital data memory, respective coefficients for the corresponding program function referenced by the respective function pointer are stored, wherein via the application program, and based on the predetermined function selection from the functions reference list stored in the digital data memory, the respective coefficients with respect to the program function referenced by the determined function pointer are determined and, via the determined function pointer and the respective coefficients, the program function corresponding to the predetermined function selection is run for processing the data contained in the input and/or output signals, wherein, during the operation of the automation device and without interrupting the application program, changes are made to the automation device that include adding additional program functions in the digital program memory, replacing and/or deleting existing program functions in the digital program memory and adapting the functions reference list stored in the digital data memory to the changes.

7. The method according to claim 6, wherein, the program function corresponding to the predetermined program function is loaded from the digital program memory to a digital main memory by the application program via the determined function pointer for processing the data contained in the input and/or output signals, and is run.

8. The method according to claim 6, wherein, via the application program and based on the predetermined function selection from the functions reference list stored in the digital data memory, function attributes with respect to the program function referenced by the determined function pointer are determined and, via the determined function pointer and the function attributes, the program function corresponding to the predetermined function selection is run for processing the data contained in the input and/or output signals.

* * * * *